United States Patent
Johnson, Jr.

(10) Patent No.: US 7,575,711 B2
(45) Date of Patent: Aug. 18, 2009

(54) APPARATUS FOR PRODUCING NANO-PARTICLES OF SILVER

(75) Inventor: Loyal M. Johnson, Jr., Tucson, AZ (US)

(73) Assignee: Climax Engineered Materials, LLC, Phoenix, AZ (US)

( * ) Notice: Subject to any disclaimer, the term of this patent is extended or adjusted under 35 U.S.C. 154(b) by 0 days.

(21) Appl. No.: 12/107,641

(22) Filed: Apr. 22, 2008

(65) Prior Publication Data

US 2008/0191395 A1 Aug. 14, 2008

Related U.S. Application Data

(62) Division of application No. 10/780,239, filed on Feb. 16, 2004, now Pat. No. 7,384,448.

(51) Int. Cl.
*C22B 11/00* (2006.01)
(52) U.S. Cl. .................................. 266/202; 266/217
(58) Field of Classification Search .............. 266/217, 266/202
See application file for complete search history.

(56) References Cited

U.S. PATENT DOCUMENTS

| 4,309,214 | A | | 1/1982 | Foulard et al. |
| 4,654,229 | A | | 3/1987 | Morita et al. |
| 4,937,150 | A | * | 6/1990 | Tsukada .................. 428/690 |
| 5,186,872 | A | | 2/1993 | Nishiwaki et al. |
| 5,472,749 | A | | 12/1995 | Dravid et al. |
| 5,514,350 | A | | 5/1996 | Kear et al. |
| 5,536,324 | A | | 7/1996 | Fuchita |
| 5,665,277 | A | | 9/1997 | Johnson et al. |
| 5,698,483 | A | | 12/1997 | Ong et al. |
| 5,788,738 | A | | 8/1998 | Pirzada et al. |
| 5,851,507 | A | | 12/1998 | Pirzada et al. |
| 5,874,684 | A | | 2/1999 | Parker et al. |
| 5,879,715 | A | | 3/1999 | Higgins et al. |
| 6,572,673 | B2 | | 6/2003 | Lee et al. |
| 6,660,058 | B1 | | 12/2003 | Oh et al. |
| 6,689,190 | B2 | | 2/2004 | Pozarnsky |
| 2003/0019328 | A1 | * | 1/2003 | Dunmead et al. ............. 75/392 |
| 2003/0077221 | A1 | * | 4/2003 | Chiruvolu et al. ........... 423/625 |
| 2003/0091488 | A1 | | 5/2003 | Taube et al. |
| 2003/0115986 | A1 | | 6/2003 | Pozarnsky et al. |
| 2003/0116017 | A1 | | 6/2003 | Pozarnsky et al. |

FOREIGN PATENT DOCUMENTS

| GB | 1307941 A | 2/1973 |
| JP | 61056209 A | 8/1984 |
| JP | 3034211 A | 3/1989 |
| WO | 0010756 A1 | 3/2000 |

* cited by examiner

*Primary Examiner*—Scott Kastler
(74) *Attorney, Agent, or Firm*—Fennemore Craig, P.C.

(57) ABSTRACT

Apparatus for producing silver nano-particle material. The apparatus includes a furnace containing a crucible for vaporizing a precursor material, as well as, a conduit disposed in perpendicular to the crucible. An inlet end of the conduit is open to the mixing region created between the conduit and the crucible. A process gas supply is also operatively associated with the mixing region.

25 Claims, 2 Drawing Sheets

50 NANOMETERS

APPARATUS FOR PRODUCING NANO-PARTICLES OF SILVER

CROSS-REFERENCE TO RELATED APPLICATIONS

The present application is a division of allowed U.S. patent application Ser. No. 10/780,239, filed Feb. 16, 2004, now U.S. Pat. No. 7,384,448, which is hereby incorporated by reference as though fully set forth herein.

FIELD OF THE INVENTION

This invention relates to the production of nano-particles in general and more particularly to a method and apparatus for producing nano-particles of silver (Ag).

BACKGROUND OF THE INVENTION

Nano-particles, that is, particles having average sizes less than about 1 micrometer (i.e., 1 micron) are known in the art and are of interest because their nano-crystalline and/or other nano-scale features dramatically change the properties of the material. For example, certain materials fabricated from nano-particles often possess superior mechanical properties compared with the same material fabricated in a conventional manner and with conventionally-sized starting materials (e.g., powders). Nano-particles of other materials may also possess unique electrical and/or magnetic properties, thereby opening the door to the fabrication of materials having previously unforeseen properties and attributes. The extremely large surface area to weight ratio of nano-particles allows nano-particles to interact with their surroundings very quickly which can also lead to the fabrication of new materials having new properties.

In sum, it is recognized that the ability to produce any material in nano-particle form represents a unique opportunity to design and develop a wide range of new and useful mechanical, optical, electrical, and chemical applications, just to name a few. However, one problem that heretofore has limited the use of nano-particles is the difficulty in producing nano-particles of the desired size and composition on a commercial scale, e.g., by the kilogram instead of by the gram.

One method for producing nano-particles involves dissolving in a solvent precursor chemicals which define the composition of the final nano-particle product. The resulting composition is mixed to yield a solution which is substantially homogenous on a molecular level. The solvent is then evaporated at a sufficient rate so that the components in the homogenized solution are precipitated as a homogenized solid powder. While such wet processes have been used to produce nano-particles of various compositions, they are not without their problems. For example, such processes tend to produce larger particles along with the nano-particles, which must then be removed or separated from the nano-particles before the nano-particles can be used. Such wet processes can also involve a significant number of process steps and reagents which tend to increase the overall cost of the final nano-particle product.

Another method for producing nano-particles is a primarily mechanical process in which the precursor material is ground in a mill (e.g., a ball mill) until particles of the desired size are produced. Unfortunately, however, such grinding processes are energy intensive, require substantial amounts of time, and typically result in the production of a powder containing not only the desired nano-particle product, but also particles having larger sizes as well. Of course, such larger sized particles must be separated from the nano-particles before they can be used. The abrasive materials used in such milling and grinding processes also tend to contaminate the nano-particle material. Consequently, such grinding processes generally are not conducive to the production of a highly pure nano-particle product.

Several other processes have been developed in which the precursor material is vaporized, typically in a partial vacuum, and then rapidly cooled in order to initiate nucleation and precipitate the nano-particle material. For example, in one process, a stream of vaporized precursor material is directed onto the surface of a cold (i.e., refrigerated) rotating cylinder. The vapor condenses on the cold surface of the cylinder. A scraper placed in contact with the rotating cylinder scrapes off the condensed material, which is then collected as the nano-particle product. In another process, the vapor stream of precursor material is condensed by expanding the vapor stream in a sonic nozzle. That is, the vapor stream is initially accelerated in the converging portion of the nozzle, ultimately reaching sonic velocity in the throat of the nozzle. The vapor stream is then further accelerated to a supersonic velocity in the diverging section of the nozzle. The supersonic expansion of the vapor stream rapidly cools the vapor stream which results in the precipitation of nano-sized particles.

While the foregoing vaporization and cooling processes have been used to produce nano-particle materials, they are not without their problems. For example, the rotating cold cylinder process has proved difficult to implement on a large scale basis and has been less than successful in producing large quantities of nano-particle material. While the sonic nozzle process is theoretically capable of producing large quantities of nano-particles on a continuous basis, it requires the maintenance of a proper pressure differential across the sonic nozzle throughout the process. Another problem with the sonic nozzle process is that the nano-particle material tends to condense on the nozzle walls, which can seriously reduce the efficiency of the nozzle, and may even prevent it from functioning. While the condensation problem can be reduced by injecting a boundary layer stream along the nozzle walls, such a provision adds to the overall complexity and operational cost of the system.

Consequently, a need remains for a method and apparatus for producing nano-particles that does not suffer from the shortcomings of the prior art methods. Such a method and apparatus should be capable of producing large quantities of nano-particle product, preferably on a continuous basis, and at a low cost. Ideally, such a method and apparatus should be less sensitive to certain process parameters than other systems, thereby allowing the method and apparatus to be more easily practiced on a large scale (i.e., commercial) basis. Additional advantages could be realized if the method and apparatus produced nano-particles in a relatively narrow size range, with a minimum amount of larger sized particles and/or contaminant materials.

BRIEF SUMMARY OF THE INVENTION

Apparatus for producing silver nano-particle material according to one embodiment of the invention comprises a furnace including an interior region with a mixing region. Positioned within the furnace is a crucible containing a quantity of precursor material. Disposed perpendicular to the crucible is a conduit, the inlet end of which is open to the mixing region and includes a hood-like portion perpendicular to the crucible. The furnace also includes an operatively associated process gas supply disposed in relation to the mixing region.

The present embodiment, furthermore, includes a particle filter coupled to the outlet end of the conduit.

According to another embodiment of the invention the apparatus comprises a crucible positioned within a furnace and containing a quantity of precursor material. Disposed in perpendicular to the crucible is a conduit, creating a mixing region between the conduit and the crucible. The inlet end of the conduit is open to the mixing region and includes a hood-like portion disposed in perpendicular to the crucible. Operatively associated with the mixing region is a process gas supply. A particle filter is coupled to the outlet end of the conduit.

Yet another embodiment of the invention comprises a furnace including a mixing region and a crucible being positioned within the furnace at a first end of the mixing region and containing a quantity of precursor material. Disposed in perpendicular to the crucible is a conduit at a second end of the mixing region. An inlet end of the conduit is open to the mixing region. Operatively associated with the mixing region is a process gas supply.

BRIEF DESCRIPTION OF THE SEVERAL VIEWS OF THE DRAWINGS

Illustrative embodiments of the invention are illustrated in the following drawings. The components in the drawings are not to scale, emphasis instead being placed upon clearly illustrating the principles of the present invention. Moreover, in the drawings, like reference numerals designate corresponding parts through the several views.

DETAILED DESCRIPTION OF THE INVENTION

Figure 1:
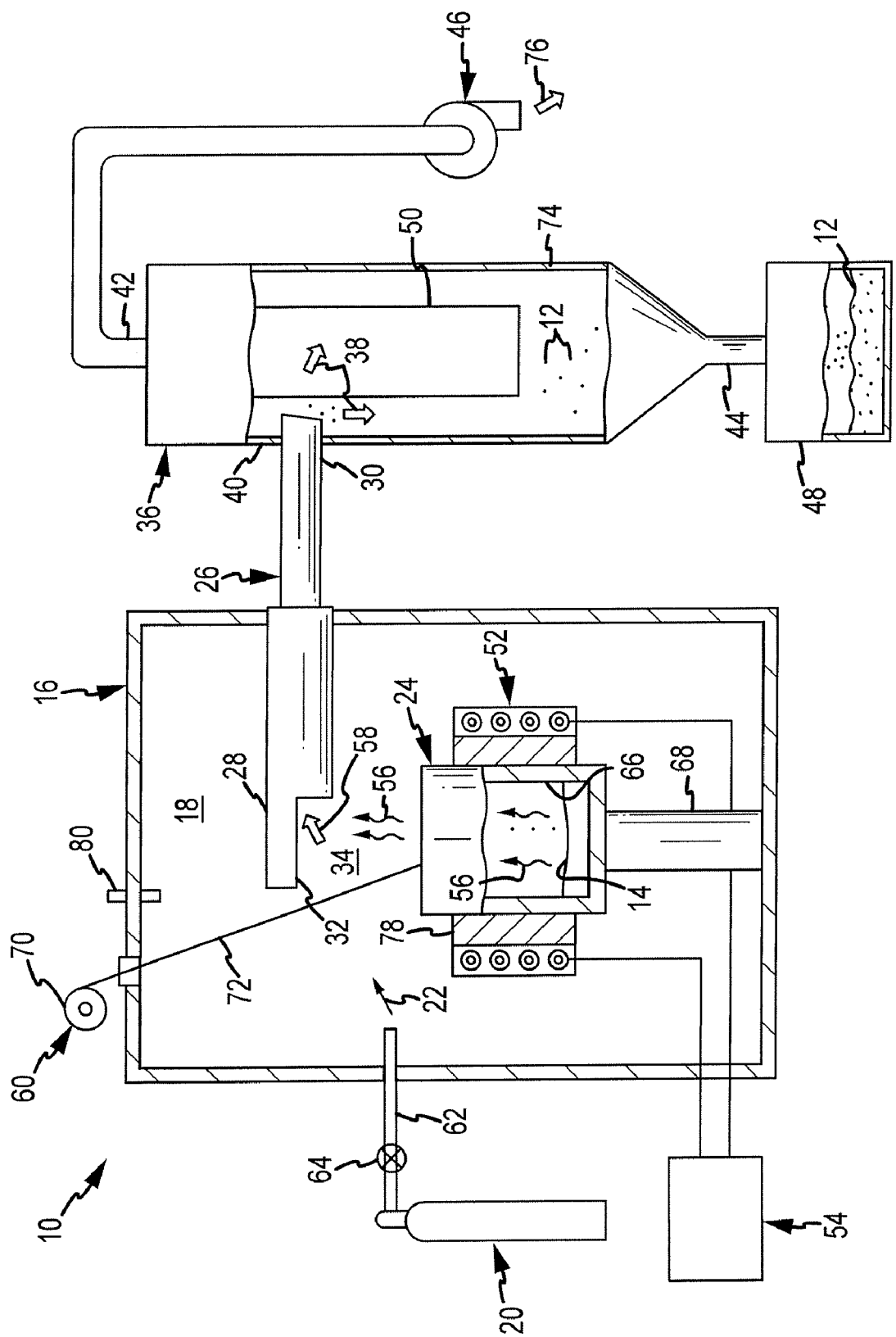
FIG. 1 is a cross-sectional view in elevation of the apparatus for producing silver nano-particle material according to one embodiment of the invention.

Apparatus 10 for producing silver (Ag) nano-particle material 12 from a precursor material 14 is shown in FIG. 1 and may comprise a furnace 16 defining an interior region 18 therein. A supply of process gas 20 is operatively associated with the furnace 16 and supplies process gas 22 to the interior region 18 of furnace 16. A crucible 24 positioned within the furnace 16 is provided with a quantity of the precursor material 14 therein. A conduit 26 having an inlet end 28 and an outlet end 30 is operatively associated with the furnace 16 so that the inlet end 28 of conduit 26 is open to the interior region 18 of the furnace 16. More specifically, the inlet end 28 of conduit 26 defines a hood-like portion 32 that is substantially vertically aligned over the crucible 24, as best seen in FIG. 1. The area defined generally between the crucible 24 and the hood-like portion 32 of the inlet end 28 of conduit 26 comprises a mixing region 34.

A particle separator system 36 is operatively connected to the outlet end 30 of conduit 26 and is used to separate the silver nano-particle material 12 from a particle-laden carrier stream 38 discharged from the outlet end 30 of conduit 26. More specifically, the particle separator system 36 comprises an inlet end 40, an outlet end 42, and a material discharge port 44. The inlet end 40 of particle separator system 36 is connected to the outlet end 30 of conduit 26. The outlet end 42 of particle separator system 36 is connected to a vacuum pump 46. The material discharge port 44 is connected to a product collection chamber 48. In one embodiment, the particle separator system 36 is also provided with a filter assembly 50 to filter or remove the silver nano-particle material 12 from the particle-laden carrier stream 38 and prevent the silver nano-particle material 12 from entering the vacuum pump 46. Consequently, substantially all of the silver nano-particle material 12 produced by the apparatus 10 will be available for recovery.

In the embodiment shown and described herein, the precursor material 14 contained in the crucible 24 is heated to the point of vaporization by an induction coil 52 surrounding the crucible 24. The induction coil 52 is electrically connected to a power supply 54. As will be described in greater detail below, the power supply 54 provides a high-frequency alternating current to the induction coil 52, which results in the heating and ultimate vaporization of the precursor material 14 via a process known as induction heating.

The apparatus 10 for producing silver nano-particle material 12 may be operated as follows. A supply of precursor material 14, for example, silver metal, is provided to the crucible 24. In the embodiment shown and described herein, the precursor material 14 may be supplied on a continuous basis by a precursor material feed system 60 in the manner that will be described below. Alternatively, the precursor material 14 may be supplied in batches. The vacuum pump 46 may be activated and a flow of process gas 22 from the process gas supply 20 initiated. The flow of process gas 22 may be adjusted in accordance with the teachings provided herein to allow the interior 18 of the furnace 16 to reach a pressure within the range of operating pressures specified herein. Exemplary pressures include pressures within the range of about 0.1 to about 6 torr. The power supply 54 may then be activated to begin heating the precursor material 14 to cause the same to vaporize. Exemplary heating temperatures include temperatures in the range of about 1600° to about 2000° C. Vaporized precursor material 56 then drifts generally upward toward the hood 32 defined by the inlet end 28 of conduit 26, whereupon it contacts the process gas 22, generally within the mixing region 34. The resulting mixture 58 of process gas 22 and vaporized precursor material 56 is drawn into the inlet end 28 of conduit 26 by the action of vacuum pump 46. As the process gas 22 combines with the vaporized precursor material 56, the process gas 22 begins to cool the vaporized precursor material 56, resulting in the precipitation of the silver nano-particle material 12. In this regard it should be noted that the process of cooling generally begins in the mixing region 34 and continues as the mixture 58 flows through the conduit 26 so that substantially all available vaporized precursor material 56 contained in the mixture 58 precipitates as the silver nano-particle material 12. Thereafter, the precipitated silver nano-particle material 12 is suspended in the particle-laden carrier stream 38 which is discharged by the outlet end 30 of conduit 26. The silver nano-particle material 12 is separated from the carrier stream 38 by the particle separator system 36 and collected in the product collection chamber 48.

Figure 2:
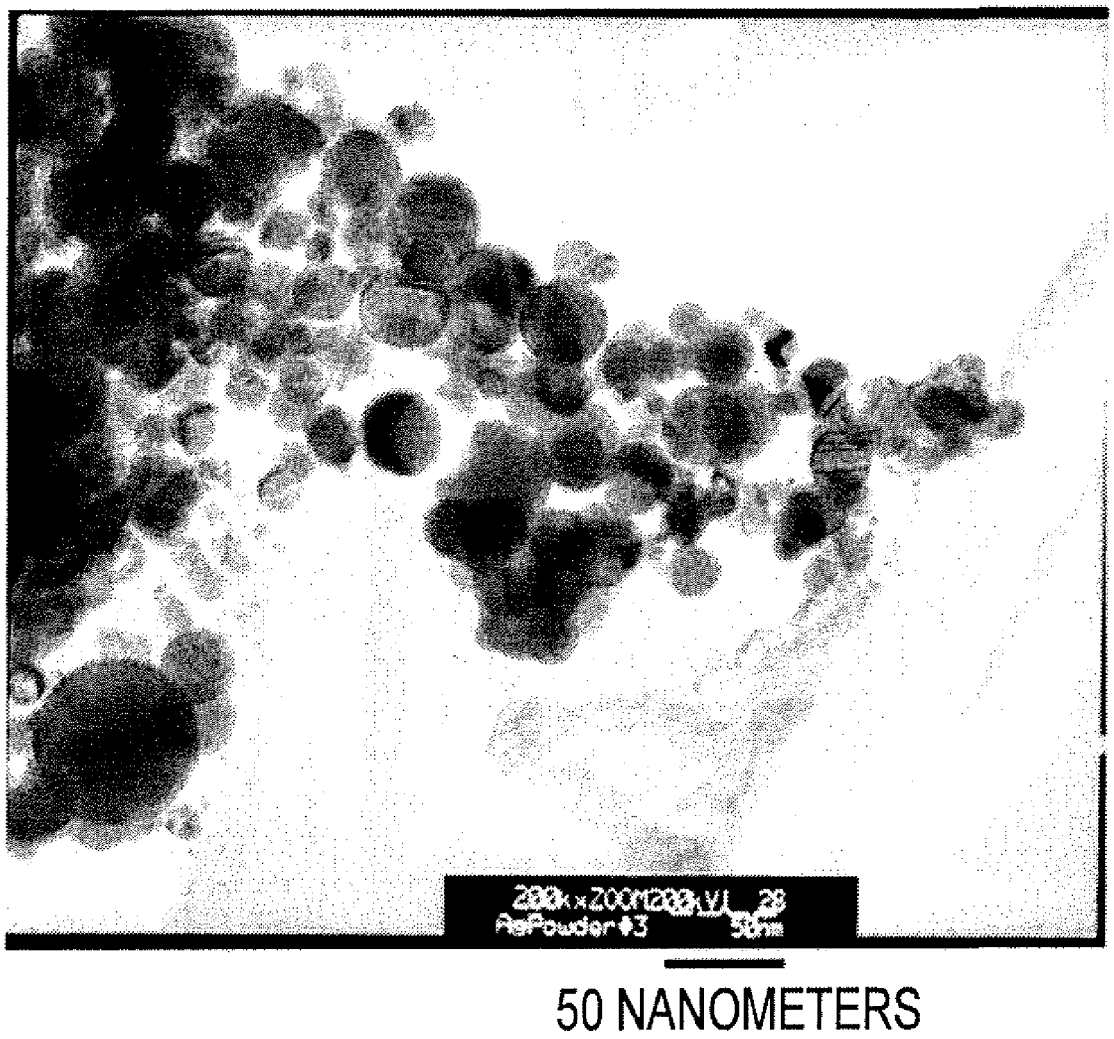
FIG. 2 is a transmission electron microscope image of silver nano-particle material produced by the present invention.

The silver nano-particle material 12 produced according to the method and apparatus of the present invention may be imaged in accordance with any of a wide range of microscopy processes that are now known in the art or that may be developed in the future that are suitable for imaging particles in the nano-size range. For example, FIG. 2 is an image of the silver nano-particle material 12 produced by a transmission electron microscope in a process generically referred to as transmission electron microscopy (TEM). As is readily seen in the TEM image illustrated in FIG. 2, each individual particle of the silver nano-particle material 12 comprises a generally spherical configuration. While the size of the silver nano-particle material 12 can be expressed in terms of the mean diameter of the particles (e.g., as imaged by transmission electron microscopy), it is generally more useful to express the size of the silver nano-particle material 12 in terms of surface area per unit weight. Measurements of particle surface area per unit weight may be obtained by BET analysis. As is well-known, BET analysis involves an extension of the Langmiur isotherm equation using multi-molecular layer absorption developed by Brunauer, Emmett, and Teller. BET analysis is an established analytical technique that provides highly accurate and definitive results. In the embodiment shown and described herein, the method and apparatus of the present invention has produced silver nano-particle material 12 having sizes in the range of about 10 to about 20 square meters/gram ($m^2/g$), or about 57 to about 28 nanometers. Alternatively, other types of measuring processes may be used to determine the particle size.

A significant advantage of the present invention is that it can be used to produce the silver nano-particle material 12 in very large quantities and at a very low cost. The present invention is also relatively simple to construct, easy to operate, and is not overly sensitive to process parameters. In addition, the ability to supply the precursor material 14 on a continuous basis allows the present invention to be readily adapted for use in large-scale (e.g., commercial) production. The silver nano-particle material 12 produced by the present invention also contains particles within a fairly narrowly-defined size range and with a minimum amount of larger-sized particles. Consequently, the silver nano-particle material 12 produced in accordance with the method and apparatus of the present invention may be generally regarded as a high quality product that requires little or no additional processing before it may be used.

Another advantage of the present invention is that it is generally immune to problems associated with the condensation of the silver nano-particle material 12 on the internal surfaces of conduit 26. Consequently, it is not necessary to take additional measures to discourage the accumulation of the silver nano-particle material 12 on the internal surfaces of the conduit 26. However, even if the silver nano-particle material 12 eventually accumulates on the internal components of the system, the simple design of the system will allow any such accumulation to be easily removed.

Having briefly described the method and apparatus according to one embodiment of the present invention, as well as some of their more significant features and advantages, the various embodiments of the method and apparatus for producing nano-particles of the present invention will now be described in detail.

Referring back now to FIG. 1, one embodiment of the apparatus 10 for producing silver nano-particle material 12 may comprise a furnace 16 having an interior region 18 defined therein. In the embodiment shown and described herein, the furnace 16 comprises a generally rectangular configuration, although other shapes or configurations are possible. The furnace may be constructed from any of a wide range of materials suitable for the intended application. Consequently, the present invention should not be regarded as limited to furnaces constructed of any particular material. However, by way of example, in one preferred embodiment, the furnace 16 is constructed from mild steel lined with copper. The interior walls of the furnace 16 may also be lined with a refractory material (e.g., mica, fire brick, etc.) (not shown) to insulate the furnace and to prevent the furnace walls from being adversely affected by the extreme heat contained therein.

The furnace 16 is also adapted to receive a flow of process gas 22. In the embodiment shown and described herein, the process gas 22 may be supplied to the interior region 18 of furnace 16 via a tube or pipe 62 connected to a process gas supply 20. The flow of process gas 22 from the process gas supply 20 may be controlled by a suitable valve/pressure regulator assembly 64 of the type well-known in the art and readily commercially available. In the embodiment shown and described herein, the combined action of the vacuum pump 46 and flow of process gas 22 should be such that the pressure of the interior region 18 of the furnace 16 can be maintained at a pressure in the range of about 0.1 to about 6 torr (3 torr preferred) during the production process. The process gas 22 may comprise any of a wide range of gases, such as, for example, nitrogen, argon, or combinations thereof. Alternatively, other inert gases, such as helium, neon, krypton, or xenon may also be used. By way of example, in one preferred embodiment the process gas 22 comprises $N_2$. Accordingly, the process gas supply 20 may comprise a supply of nitrogen, either in liquid or gas form. However, because apparatus for supplying such process gases are well-known in the art and could be readily provided by persons having ordinary skill in the art, the supply of process gas 20 and associated components will not be described in further detail herein.

The crucible 24 provided within the furnace 16 receives the precursor material 14 and serves to contain the precursor material 14 while it is heated and, ultimately, vaporized within the crucible 24. In the embodiment shown and described herein, the crucible 24 comprises a generally cup-shaped member having an open top through which to receive the precursor material 14 and through which escapes the vaporized precursor material 56. The crucible 24 may be supported within the furnace 16 by any convenient means, such as a support tube 68. The crucible 24 and support tube 68 should be made from materials suitable for withstanding the temperatures required to vaporize the precursor material 14 (e.g., temperatures in the range of about 1600° C. to about 2000° C.). By way of example, in one preferred embodiment, the crucible 24 comprises carbon graphite, whereas the support tube 68 comprises quartz, although other materials could be used. The carbon graphite material used in one preferred embodiment comprises No. ISO-63, commercially available from Advanced Graphite Engineering of Greenville, Mich. 48838. If the crucible 24 comprises carbon graphite or other reactive material (that is not desired to react with the precursor material 14), the interior surfaces of crucible 24 should be provided with a non-reactive coating or liner 66 to prevent the graphite or other reactive material from reacting with the precursor material 14. By way of example, in one preferred embodiment, the non-reactive coating or liner 66 comprises ceramic item No. AC6043, commercially available from GE Advanced Ceramics of Strongville, Ohio 44149. Alternatively, such a non-reactive liner 66 would not be required if the entire crucible 24 were to be fabricated from a non-reactive material.

The crucible 24 may comprise any of a wide range of sizes depending on the capacity and desired production rate of the apparatus 10. Consequently, the present invention should not be regarded as limited to a crucible 24 having any particular size. However, by way of example, in one preferred embodiment, the crucible 24 has an outside diameter of about 8 cm and a height of about 8 cm.

As mentioned above, in one embodiment, the precursor material 14 provided in the crucible 24 is heated via induction heating. Accordingly, the furnace 16 is provided with an induction coil 52 therein that surrounds the crucible 24. In this arrangement, the crucible 24 functions as the susceptor for the induction coil 52 that surrounds the carbon graphite crucible 24. In the embodiment shown and described herein, the induction coil 52 comprises several turns (e.g., 4 turns) of copper tubing through which water is caused to flow as a coolant. Each end of the coiled copper tubing is connected to a power supply 54 which supplies alternating current to the copper tubing comprising the induction coil 52. In one embodiment, the power supply 54 supplies alternating current power to the induction coil 52 at voltage of about 105 volts, a current of about 9 kilowatts, and a frequency of about 10,000 Hz. However, because induction coils and power supplies for providing electrical power to such induction coils are well-known in the art and could be readily supplied by persons having ordinary skill in the art after having become familiar with the details of the present invention, the particular induction coil and power supply that may be utilized in embodiments of the invention will not be described in further detail herein.

In the embodiment shown and described herein, an insulating material 78 is provided between the induction coil 52 and crucible 24. The insulating material 78 prevents excessive heat from being transferred between the crucible 24 and the induction coil 52. The insulating material 78 may comprise any of a wide range of materials suitable for the high temperatures involved. By way of example, in one preferred embodiment, the insulating material comprises a carbon-black felt material.

The apparatus 10 may also be provided with a infrared temperature sensor 80 suitable for sensing the temperature of the precursor material 14 contained within the crucible 24. Alternatively, other types of temperature sensors may also be used to allow the temperature of the crucible 24 and/or precursor material 14 contained therein to be monitored.

The apparatus 10 may also be provided with a precursor material feed system 60 to provide a continuous supply of precursor material 14 to the crucible 24. In one embodiment, the precursor material feed system 60 comprises a supply (e.g., a spool) 70 of wire 72. The feed system 60 may also be provided with a wire-feed speed regulator system (not shown) to regulate or control the speed at which the wire 72 is fed into the crucible 24. However, because systems for feeding wire and systems for feeding other forms of precursor material 14 (e.g., powder, pellets, etc.) are known in the art and could be easily provided by persons having ordinary skill in the art after having become familiar with the teachings provided herein, the particular components and devices that may be utilized in the precursor material feed system 60 will not be described in further detail herein.

The conduit 26 comprises a generally cylindrically-shaped tube-like member having an inlet end 28 and an outlet end 30. The conduit 26 is operatively associated with the furnace 16 so that the inlet end 28 is positioned within the interior region 18 defined by the furnace 16 and so that the outlet end 30 is exterior to the furnace 16. A portion of the inlet end 28 of conduit 26 is cut-away to form a hood-like portion 32 that is substantially vertically aligned over the crucible 24. Alternatively, a separate member could be provided that defines the hood-like portion 32 of inlet end 28. As mentioned above, the area defined generally between the crucible 24 and the hood-like portion 32 of the inlet end 28 of conduit 26 comprises mixing region 34.

The conduit 26 may have dimensions that are commensurate with the size (i.e., desired production capacity) of the apparatus 10 for producing silver nano-particle material 12. Accordingly, the present invention should not be regarded as limited to a conduit 26 having any particular size. However, by way of example, in one preferred embodiment, the conduit 26 has an inside diameter ranging from about 90 mm inside the furnace 16 to a diameter of about 51 mm outside the furnace 16, and a total length of about 865 mm. The conduit 26 may be fabricated from any of a wide range of materials suitable for the intended application, keeping in mind the extreme temperatures (e.g., in the range of about 1600° C. to about 2000° C.) existing within the interior region 18 of the furnace 16. Accordingly, in one preferred embodiment, the conduit 26 is fabricated from quartz. However, it should be noted that the conduit 26 need not comprise the same material throughout, but instead could comprise different materials depending on whether they are located within the furnace 16. For example, in the embodiment shown and described herein, the portion of the conduit 26 contained within the furnace 16 comprises quartz. However, the portion of the conduit 26 located outside of the furnace 16 may be fabricated from other materials since the outside portion of the conduit 26 will not be exposed to extreme temperatures. For example, in one preferred embodiment, the portion of the conduit 26 exterior to the furnace 16 is fabricated from stainless steel. The two different sections (e.g., the quartz section and the stainless steel section) of the conduit 26 may be joined together by any convenient means, as would be obvious to persons having ordinary skill in the art after having become familiar with the teachings of the present invention.

The particle separator system 36 is operatively associated with the conduit 26 and serves to separate the silver nano-particle material 12 from the carrier stream 38 discharged by the conduit 26. In one embodiment, the particle separator system 36 comprises a generally cylindrically-shaped housing 74 having an inlet end 40, an outlet end 42, and a material discharge port 44. The housing 74 is also sized to receive a filter 50. The inlet end 40 of housing 74 is connected to the outlet end 30 of conduit 26 in the manner illustrated in FIG. 1. The outlet end 42 of housing 74 is fluidically connected to vacuum pump 46. The material discharge port 44 is located at the lower portion of the housing 74 and may be connected to a product collection chamber 48.

The filter 50 contained in the housing 74 may comprise any of a wide range of filter materials known in the art and readily commercially available that would be effective for separating or filtering the silver nano-particle material 12 from the carrier stream 38 to substantially prevent the silver nano-particle material 12 from entering the vacuum pump 46. Consequently, the present invention should not be regarded as limited to a filter 50 comprising any particular material. However, by way of example, in one preferred embodiment, the filter element 50 comprises a filter element available from the Grainger Company as filter canister no. 6JD03, and filter cartridge no. 6JC96. The filter 50 may be harvested from time-to-time to remove accumulated silver nano-particle material 12.

In an alternative embodiment, the particle separator system 36 may comprise a liquid scrubber-type filter (not shown) wherein the silver nano-particle material 12 is collected by bubbling the carrier stream 38 through a liquid. This type of particle separator system could be used to advantage if a slurry containing the silver nano-particle material is the desired product. Any of a wide range of liquids could be used, again depending on the nature of the slurry product desired. Alternatively, the liquid and silver nano-particle material could be separated by conventional techniques if so desired. Still other filtering devices and other separation processes (whether with or without filters) are possible and could be used to capture and remove the silver nano-particle material 12 from the carrier stream 38, as would be obvious to persons having ordinary skill in the art after having become familiar with the teachings of the present invention. Consequently, the present invention should not be regarded as limited to the particular product collection apparatus shown and described herein.

The vacuum pump 46 may comprise any of a wide range of vacuum pumps known in the art and readily commercially available that would be suitable for maintaining the pressure within the furnace within the ranges specified herein. By way of example, in one preferred embodiment, the vacuum pump 46 comprises a SDS 800 type vacuum pump, commercially available from Stokes Vacuum, Inc. of Philadelphia, Pa. 19120.

The apparatus 10 may be operated in accordance with the following method in order to produce silver nano-particle material 12. As mentioned, the silver nano-particle material 12 is produced by vaporizing a precursor material 14 which may comprise metallic silver. In the embodiment shown and described herein, the metallic silver precursor material 14 is derived from silver wire 72 that is fed into the crucible 24 on a continuous basis by the precursor material feed system 60. Alternatively, the precursor material 14 may be provided in batches. Once the precursor material 14 is delivered to the crucible 24 contained within the furnace 16, the induction coil 52 heats the precursor material 14 to a temperature in the range of about 1600° C. to about 2000° C., which is sufficient to vaporize the silver precursor material 14, resulting in the production of a vaporized precursor material 56. Optimum results may be obtained within a temperature in the range of about 1700° C. to about 1800° C. The pressure within the furnace is maintained by adjusting the flow of process gas 22 and/or the vacuum pump 46 to maintain the internal pressure of the furnace 16 within a range of about 0.1 torr to about 6 torr, with optimum results being obtained with a pressure in the range of about 2 torr to about 4 torr.

The vaporized precursor material 56 drifts generally upwardly out of the crucible 24 and enters the mixing region 34, whereupon it begins to mix with the process gas 22. By way of example, in one preferred embodiment, the process gas 22 may comprise nitrogen. However, other process gases, such as any of the inert gases (e.g., helium, neon, argon, krypton, xenon, or mixtures thereof), may also be used. Alternatively, mixtures of nitrogen and any of the inert gases may also be used. The mixing of the vaporized precursor material 56 and the process gas 22 results in the formation of the mixture 58. In addition, the process gas 22 begins to cool the vaporized precursor material 56, thus beginning the precipitation within the mixture 58 of the silver nano-particle material 12. The mixture 58 of process gas 22, vaporized precursor material 56, and amounts of precipitated silver nano-particle material 12 enters the inlet end 28 of conduit 26 by the action of vacuum pump 46. Additional amounts of the silver nano-particle material 12 continue to precipitate from the mixture 58 until, by the time it reaches the outlet end 30 of conduit 26, substantially all of the vaporized precursor material 56 has been precipitated as the silver nano-particle material 12. The precipitated silver nano-particle material 12 exits the outlet end 30 of conduit 26 as particle-laden carrier stream 38. Thereafter, the silver nano-particle material 12 is ultimately separated from the particle-laden carrier stream 38 by the particle separator system 36. The remaining carrier stream 38 passes through the filter 50 and vacuum pump 46 and is discharged into the surrounding atmosphere as filtered carrier stream 76. The silver nano-particle material 12 is collected within the lower portion of the housing 74 of particle separator system 36 and is ultimately discharged through the material discharge port 44 into the product collection chamber 48. The filter 50 may be harvested from time-to-time to collect additional amounts of silver nano-particle material 12 that may have accumulated on the filter 50.

FIG. 2 is an image of the silver nano-particle material 12 produced by a transmission electron microscope in a process that is commonly referred to as transmission electron microscopy (TEM). As is readily seen in FIG. 2, each individual particle of the nano-particle material 12 comprises a generally spherically-shaped configuration. While the size of the nano-particle material 12 can be expressed in terms of the mean diameter of the particles (e.g., as detected by transmission electron microscopy), it is generally more useful to express the size of the silver nano-particle material 12 in terms of surface area per unit weight. Measurements of particle surface area are per unit weight may be obtained by BET analysis which is, as mentioned above, an established analytical technique that provides highly accurate and definitive results. In the embodiment shown and described herein, the method and apparatus of the present invention has been used to produce a nano-particle material having a size in the range of about 10 to about 20 square meters/gram ($m^2/g$), as measured in accordance with the BET analysis technique, or about 57 to about 28 nanometers. Alternatively, other types of measuring processes may be used to determine the particle size.

EXAMPLE

In this Example, the apparatus 10 comprised the various components and having the configurations described herein. The precursor material 14 comprised metallic silver wire 72 having a diameter of 3.18 mm (0.125 inches) and a purity of about 99.9%. The process gas 22 comprised nitrogen and the flow thereof was regulated to provide a pressure within the furnace 16 of about 3 torr. The silver wire 72 was fed into the crucible 24 in a continuous manner at a rate of about 360 g/hour. Once within the crucible, the precursor material 14 was heated to a temperature of about 1725° C. which was sufficient to vaporize the silver precursor material 14. Once the vaporized precursor material 56 began to contact the process gas 22, the apparatus 10 started to produce the silver nano-particle material 12. The silver nano-particle material 12 was then separated by the separator 36 as described hereinabove and ultimately filtered or separated from the carrier stream 38. The silver nano-particle material 12 was collected in the product collection chamber 48 as described above. The apparatus 10 was operated in this manner for a time period of about 60 minutes, which resulted in the production of about 270 g of silver nano-particle material 12.

Having herein set forth preferred embodiments of the present invention, it is anticipated that suitable modifications can be made thereto which will nevertheless remain within the scope of the invention.

What is claimed is:

1. Apparatus for producing silver nano-particle material comprising:

a furnace, the furnace including an interior region with a mixing region;

a crucible, the crucible being positioned within the furnace and containing a quantity of precursor material;

a conduit, the conduit being disposed perpendicularly to the crucible and having an inlet end and an outlet end, the inlet end being open to the mixing region;

a process gas supply, the process gas supply being operatively associated with the furnace, said process gas supply provoding a process gas to the mixing region; and a particle filter, the particle filter having an inlet end and an outlet end, the inlet end of the particle filter being coupled to the outlet end of the conduit.

2. The apparatus of claim 1, further comprising a vacuum coupled to the outlet end of the particle filter, and a collection chamber, the collection chamber being coupled to the particle filter and configured to collect filtered silver nano-particle material.

3. The apparatus of claim 1, further comprising induction coils operatively associated with the furnace and configured to generate heat in a temperature range of about 1600° C. to about 1800° C.

4. Apparatus for producing silver nano-particle material comprising:
   a furnace;
   a crucible, the crucible being positioned within the furnace and containing a quantity of precursor material;
   a conduit, the conduit being disposed perpendicularly to the crucible, to create a mixing region between the conduit and the crucible, and having an inlet end and an outlet end, the inlet end being open to the mixing region;
   a process gas supply, the process gas supply being operatively associated with the mixing region; and
   a particle filter comprising an inlet end and an outlet end, the inlet end of the particle filter being coupled to the outlet end of the conduit.

5. The apparatus of claim 4, further comprising a vacuum coupled to the outlet end of the particle filter, and a collection chamber coupled to the particle filter configured to collect filtered silver nano-particle material.

6. The apparatus of claim 4, further comprising induction coils operatively associated with the furnace and configured to generate heat in a temperature range of about 1600° C. to about 1800° C.

7. Apparatus for producing silver nano-particle material comprising:
   a furnace, the furnace including a mixing region;
   a crucible, the crucible being positioned within the furnace at a first end of the mixing region and containing a quantity of precursor material;
   a conduit, the conduit being disposed perpendicularly to the crucible at a second end of the mixing region and having an inlet end open to the mixing region;
   a process gas supply operatively associated with the mixing region; and
   a particle filter including an inlet end and an outlet end, the inlet end of the particle filter being coupled to an outlet end of the conduit.

8. The apparatus of claim 7, further comprising a vacuum coupled to the outlet end of the particle filter, and a collection chamber coupled to the particle filter configured to collect filtered silver nano-particle material.

9. Apparatus for producing silver nano-particle material, comprising:
   a furnace, said furnace defining an interior region therein;
   a crucible positioned within said furnace, said crucible containing a quantity of precursor material, said furnace heating the quantity of precursor material contained in said crucible to vaporize the precursor material;
   a process gas supply operatively associated with said furnace, said process gas supply providing a process gas to the interior region of said furnace;
   a conduit having an inlet end and an outlet end, the inlet end of said conduit being open to the interior region of said furnace;
   a particle separator system comprising an inlet end and an outlet end, the inlet end of said particle separator system being connected to the outlet end of said conduit; and
   a pump operatively associated with the outlet end of said separator, said pump causing a mixture of process gas and vaporized precursor material contained in the interior region of said furnace to be drawn into the inlet end of said conduit, the process gas cooling the vaporized precursor material to precipitate said silver nano-particle material in a carrier stream, said particle separator system separating said silver nano-particle material from the carrier stream.

10. The apparatus of claim 9, wherein the inlet end of said conduit further comprises a hood-like portion.

11. The apparatus of claim 10, wherein the hood-like portion of the inlet end of said conduit is positioned in substantially vertical alignment over said crucible, the hood-like portion and the crucible defining a mixing region substantially therebetween.

12. The apparatus of claim 9, wherein said particle separator system further comprises a material discharge port, said silver nano-particle material being discharged to said material discharge port.

13. The apparatus of claim 12, further comprising a product collection apparatus operatively associated with the material discharge port of said particle separator system, said product collection apparatus collecting said silver nano-particle material.

14. The apparatus of claim 12, wherein said particle separator system further comprises a filter positioned between the inlet end and the outlet end, said filter separating additional amounts of said silver nano-particle material from the carrier stream.

15. The apparatus of claim 9, further comprising: an induction coil positioned within said furnace, said induction coil being magnetically coupled to said crucible; and a power supply operatively connected to said induction coil, said power supply causing an alternating electrical current to flow in said induction coil.

16. The apparatus of claim 15, wherein said induction coil substantially surrounds said crucible.

17. The apparatus of claim 16, further comprising an insulator positioned between said induction coil and said crucible.

18. The apparatus of claim 9, wherein said crucible comprises carbon graphite.

19. The apparatus of claim 18, further comprising a non-reactive liner provided on an interior surface of said crucible.

20. The apparatus of claim 19, wherein said non-reactive liner comprises ceramic.

21. The apparatus of claim 9, further comprising a precursor material feed system, said precursor material feed system continuously providing the precursor material to said crucible.

22. The apparatus of claim 21, wherein said precursor material feed system further comprises:
   a supply of precursor material in metallic wire form; and
   wire feed apparatus, said wire feed apparatus feeding the metallic wire form precursor material to said crucible.

23. The apparatus of claim 9, wherein said process gas supply comprises a supply of nitrogen.

24. The apparatus of claim 9, wherein said conduit comprises quartz.

25. The apparatus of claim 9, wherein said process gas supply comprises a supply of argon.

* * * * *